US010370930B2

(12) United States Patent
Fripp et al.

(10) Patent No.: US 10,370,930 B2
(45) Date of Patent: Aug. 6, 2019

(54) DOWNHOLE TOOLS COMPRISING AQUEOUS-DEGRADABLE ELASTOMER SEALING ELEMENTS WITH CARBODIIMIDE (71) Applicant: Halliburton Energy Services, Inc., Houston, TX (US)

(72) Inventors: Michael Linley Fripp, Carrollton, TX (US); Zachary William Walton, Carrollton, TX (US); Charles Timothy Smith, McKinney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 500 days.

(21) Appl. No.: 14/781,925

(22) PCT Filed: Jun. 15, 2015

(86) PCT No.: PCT/US2015/035823
§ 371 (c)(1),
(2) Date: Oct. 2, 2015

(87) PCT Pub. No.: WO2016/007260
PCT Pub. Date: Jan. 14, 2016

(65) Prior Publication Data
US 2016/0222752 A1 Aug. 4, 2016

Related U.S. Application Data (63) Continuation-in-part of application No. PCT/US2014/045535, filed on Jul. 7, 2014.

(51) Int. Cl.
E21B 33/12 (2006.01)
E21B 33/128 (2006.01)
(Continued)

(52) U.S. Cl.
CPC .......... *E21B 33/1208* (2013.01); *C08K 5/092* (2013.01); *E21B 29/02* (2013.01);
(Continued)

(58) Field of Classification Search
CPC ...... E21B 29/02; E21B 33/12; E21B 33/1208; E21B 33/128; E21B 33/129; E21B 43/26
See application file for complete search history.

(56) References Cited

U.S. PATENT DOCUMENTS 3,193,522 A * 7/1965 Fischer .................... C08K 5/29
524/195
4,862,967 A 9/1989 Harris
(Continued)

FOREIGN PATENT DOCUMENTS

CA 2942163 A1 9/2015
EP 0910598 B1 5/2005
(Continued)

OTHER PUBLICATIONS

Canadian Office Action from Canadian Patent Application No. 2,948,658 dated Oct. 18, 2017, 3 pages.
(Continued)

Primary Examiner — Caroline N Butcher
(74) Attorney, Agent, or Firm — McGuireWoods LLP (57) ABSTRACT Downhole tools comprising a body, wherein at least a portion of the body is degradable when exposed to a wellbore environment; and at least one aqueous-degradable sealing element comprising an aqueous-degradable elastomer comprising in the range of 0.05 to 1 parts by weight per hundred parts of the elastomer (phr) carbodiimide, wherein at least a portion of the aqueous-degradable sealing element hydrolytically degrades when exposed to an aqueous fluid.

28 Claims, 3 Drawing Sheets (51) Int. Cl.
*E21B 43/26* (2006.01)
*E21B 29/02* (2006.01)
*E21B 33/129* (2006.01)
*C08K 5/092* (2006.01)

(52) U.S. Cl.
CPC ............ *E21B 33/12* (2013.01); *E21B 33/128* (2013.01); *E21B 33/129* (2013.01); *E21B 43/26* (2013.01)

(56) References Cited

U.S. PATENT DOCUMENTS

| | | | |
|---|---|---|---|
| 5,102,559 | A | 4/1992 | McDougall et al. |
| 5,883,199 | A | 3/1999 | McCarthy et al. |
| 6,076,600 | A | 6/2000 | Vick, Jr. et al. |
| 6,818,594 | B1 | 11/2004 | Freeman et al. |
| 7,168,494 | B2 | 1/2007 | Starr et al. |
| 7,681,653 | B2 | 3/2010 | Korte et al. |
| 7,699,101 | B2 | 4/2010 | Fripp et al. |
| 7,946,351 | B2 | 5/2011 | Freyer |
| 8,127,856 | B1 | 3/2012 | Nish et al. |
| 8,181,708 | B2 | 5/2012 | Korte et al. |
| 8,586,507 | B2 | 11/2013 | Deville |
| 8,720,556 | B2 | 5/2014 | Todd |
| 8,726,992 | B2 | 5/2014 | Freyer |
| 9,790,763 | B2 | 10/2017 | Fripp et al. |
| 2004/0231845 | A1 | 11/2004 | Cooke |
| 2004/0261999 | A1 | 12/2004 | Nguyen |
| 2005/0164894 | A1 | 7/2005 | Eoff et al. |
| 2005/0205264 | A1 | 9/2005 | Starr et al. |
| 2005/0205266 | A1* | 9/2005 | Todd ............... E21B 23/00 166/376 |
| 2005/0230107 | A1 | 10/2005 | McDaniel et al. |
| 2006/0042798 | A1 | 3/2006 | Badalamenti et al. |
| 2006/0276345 | A1 | 12/2006 | Todd et al. |
| 2007/0027245 | A1 | 2/2007 | Vaidya et al. |
| 2007/0107908 | A1 | 5/2007 | Vaidya et al. |
| 2010/0139930 | A1 | 6/2010 | Patel et al. |
| 2011/0005778 | A1* | 1/2011 | Foster ............... E21B 23/01 166/382 |
| 2011/0067889 | A1 | 3/2011 | Marya et al. |
| 2011/0240293 | A1 | 10/2011 | Lesko et al. |
| 2012/0080189 | A1 | 4/2012 | Marya et al. |
| 2012/0267111 | A1 | 10/2012 | Khlestkin |
| 2013/0025859 | A1 | 1/2013 | Liang et al. |
| 2013/0062072 | A1 | 3/2013 | Alvarez et al. |
| 2013/0073812 | A1 | 3/2013 | Kanai et al. |
| 2013/0133887 | A1 | 5/2013 | Todd |
| 2013/0161024 | A1 | 6/2013 | Greci |
| 2013/0233546 | A1 | 9/2013 | Liang et al. |
| 2013/0264054 | A1 | 10/2013 | East et al. |
| 2013/0292123 | A1 | 11/2013 | Murphree et al. |
| 2014/0076571 | A1 | 3/2014 | Frazier et al. |
| 2014/0116701 | A1 | 5/2014 | Tang |
| 2014/0116704 | A1 | 5/2014 | Reddy et al. |
| 2014/0262327 | A1* | 9/2014 | Xu ............... E21B 29/00 166/376 |
| 2015/0285026 | A1 | 10/2015 | Frazier |
| 2016/0177655 | A1 | 6/2016 | Fripp et al. |
| 2016/0290090 | A1 | 10/2016 | Murphree et al. |
| 2017/0016298 | A1* | 1/2017 | Takahashi ............ C08K 5/0016 |

FOREIGN PATENT DOCUMENTS

| | | | |
|---|---|---|---|
| WO | WO-2014/000141 | A1 | 1/2014 |
| WO | 2014192885 | A1 | 12/2014 |
| WO | WO-2015156827 | A1 | 10/2015 |
| WO | 2016007119 | A1 | 1/2016 |
| WO | 2016007259 | A1 | 1/2016 |
| WO | 2016007260 | A1 | 1/2016 |
| WO | WO-2016/003759 | A1 | 1/2016 |

OTHER PUBLICATIONS

Canadian Office Action from Canadian Patent Application No. 2,948,465, dated Sep. 20, 2017, 4 pages.
International Search Report dated May 2, 2016 for International Application No. PCT/US2015/067286.
International Search Report and Written Opinion for PCT/US2015/035812 dated Aug. 28, 2015.
Carbodiimide in Millathane® 5004 (2004), <http://www.tse-industries.com/sites/default/files/techinfo/M5004_Carbodiimide_39686.pdf>.
Hydrolysis Stabilizer for Polyesters Including Bio-plastics (2009), <http://www.nisshinbo-chem.co.jp/english/products/carbodilite/poly.html>.
Vroman et al., Biodegradable Polymers, Materials 2009, 2, 307-344; doi:10.3390/ma2020307.
International Search Report and Written Opinion for PCT/US2015/035823 dated Aug. 28, 2015.
Ali et al., "Synthesis of biodegradable and flexible, polyactic acid based, thermoplastic polyurethane with high gas barrier properties," Polymer lnernational, Sep. 2014.
Liu et al., "Mechanical properties, water-swelling behavior, and morphology of water-swellable rubber prepared using crosslinked sodium polyacrylate," J Applied Polymer Science, vol. 102(2) pp. 1489-1496, Oct. 15, 2006.
Tanrattanakul et al., "Effect of differnet plasticizers on the properties of bio-based thermoplastic elastomer containing poly(lactic acid) and natural rubber," eXPRESS Polymer Letters, Jan. 2014.
Usuki et al., "Preparation and properties of EPDM-clay hybrids," Polymer, vol. 43(8), pp. 2186-2189, Apr. 2002.
Australian Examination Report from Australian Patent Application No. 2014400642, dated Mar. 9, 2017.
Australian Examination Report from Australian Patent Application No. 2015288256, dated Mar. 9, 2017.
International Search Report and Written Opinion from International Application No. PCT/US2014/045535, dated Apr. 7, 2015.
Australian Examination Report from Australian Patent Application No. 2015398727, dated Feb. 9, 2018, 8 pages.
Australian Office Action from Australian Patent Application No. 2016280375, dated May 3, 2018, 7 pages.

* cited by examiner

DOWNHOLE TOOLS COMPRISING AQUEOUS-DEGRADABLE ELASTOMER SEALING ELEMENTS WITH CARBODIIMIDE

CROSS-REFERENCE TO RELATED APPLICATIONS

This application is a continuation-in-part of PCT/US2014/045535, titled "Downhole Tools Comprising Aqueous-Degradable Sealing Elements," and filed Jul. 7, 2014.

BACKGROUND

The present disclosure generally relates to downhole tools comprising aqueous-degradable elastomer sealing elements and, more specifically, to downhole tools comprising an aqueous-degradable elastomer sealing element having less than 1 part by weight per hundred parts of the elastomer resin (phr) of carbodiimide.

A variety of downhole tools are used within a wellbore in connection with producing or reworking a hydrocarbon bearing subterranean formation. The downhole tool may comprise a wellbore zonal isolation device capable of fluidly sealing two sections of the wellbore from one another and maintaining differential pressure (i.e., to isolate one pressure zone from another). The wellbore zonal isolation device may be used in direct contact with the formation face of the wellbore, with casing string, with a screen or wire mesh, and the like.

After the production or reworking operation is complete, the seal formed by the downhole tool must be broken and the tool itself removed from the wellbore. The downhole tool must be removed to allow for production or further operations to proceed without being hindered by the presence of the downhole tool. Removal of the downhole tool(s) is traditionally accomplished by complex retrieval operations involving milling or drilling the downhole tool for mechanical retrieval. In order to facilitate such operations, downhole tools have traditionally been composed of drillable metal materials, such as cast iron, brass, or aluminum. These operations can be costly and time consuming, as they involve introducing a tool string (e.g., a mechanical connection to the surface) into the wellbore, milling or drilling out the downhole tool (e.g., at least breaking the seal), and mechanically retrieving the downhole tool or pieces thereof from the wellbore to bring to the surface.

To reduce the cost and time required to mill or drill a downhole tool from a wellbore for its removal, degradable downhole tools have been developed. Traditionally, however, such degradable downhole tools have been designed only such that the degradable portion includes the tool body itself and not any sealing element of the downhole tool. This is particularly evident because the degradable materials that have been proposed for use in forming a downhole tool body are often highly brittle and are physically or chemically incapable of exhibiting expansive or elastic properties necessary for a sealing element. Instead, the known degradable downhole tools may degrade such that it no longer provides the structural integrity necessary for achieving an effective seal with the non-degradable sealing element.

BRIEF DESCRIPTION OF THE DRAWINGS

The following figures are included to illustrate certain aspects of the embodiments and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure generally relates to downhole tools comprising aqueous-degradable elastomer sealing elements and, more specifically, to downhole tools comprising an aqueous-degradable elastomer sealing element having less than 1 part by weight per hundred parts of the elastomer resin (phr) of carbodiimide.

As used herein, the term "degradable" and all of its grammatical variants (e.g., "degrade," "degradation," "degrading," and the like) refers to the dissolution or chemical conversion of materials into smaller components, intermediates, or end products by at least one of solubilization, hydrolytic degradation, biologically formed entities (e.g., bacteria or enzymes), chemical reactions, thermal reactions, or reactions induced by radiation. The term "at least a portion" with reference to degradation (e.g., "at least a portion of the body is degradable" or "at least a portion of the aqueous-degradable sealing element is degradable," and grammatical variants thereof) refers to degradation of at least about 80% of the volume of that part. In some instances, the degradation of the material may be sufficient for the mechanical properties of the material to reduce to a point that the material no longer maintains its integrity and, in essence, falls apart. The conditions for degradation are generally wellbore conditions where an external stimulus may be used to initiate or affect the rate of degradation. For example, the pH of the fluid that interacts with the material may be changed by introduction of an acid or a base. The term "wellbore environment" includes both naturally occurring wellbore environments and introduced materials into the wellbore.

Disclosed are various embodiments of a downhole tool including an aqueous-degradable sealing element capable of fluidly sealing two sections of a wellbore (which may be also referred to as "setting" the downhole tool). The downhole tool may have various setting mechanisms for fluidly sealing the sections of the wellbore with the sealing element including, but not limited to, hydraulic setting, mechanical setting, setting by swelling, setting by inflation, and the like. The downhole tool may be a well isolation device, such as a frac plug, a bridge plug, or a packer, a wiper plug, a cement plug, or any other tool requiring a sealing element for use in a downhole operation. Such downhole operations may include, but are not limited to, any type of fluid injection operation (e.g., a stimulation/fracturing operation, a pinpoint acid stimulation, casing repair, and the like), and the like. In some embodiments, the downhole tool may comprise a body and at least one aqueous-degradable sealing element composed of an aqueous-degradable elastomer. The aqueous-degradable sealing element may degrade in a wellbore environment, such as upon contact with an aqueous fluid therein. As discussed in detail below, degradation of the aqueous-degradable sealing element may be accelerated, rapid, or normal, degrading anywhere from about 2 hours to about 120 days from first contact with an aqueous fluid, for example.

In some embodiments, at least a portion of the body itself may also be degradable upon exposure to the wellbore environment. The embodiments herein permit fluid sealing of two wellbore sections with a downhole tool having an aqueous-degradable sealing element that later degrades in situ, preferably without the need to mill or drill, and retrieve the downhole tool from the wellbore. In particular, the degradation of the aqueous-degradable sealing element results in failure of the sealing element to maintain differential pressure and form an effective seal. In such cases, the downhole tool may drop into a rathole in the wellbore without the need for retrieval or may be sufficiently degraded in the wellbore so as to be generally indiscernible. It will be appreciated by one of skill in the art that while the embodiments herein are described with reference to a downhole tool, the aqueous-degradable sealing elements disclosed herein may be used with any wellbore operation equipment that may preferentially degrade upon exposure to aqueous fluids.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Figure 1:
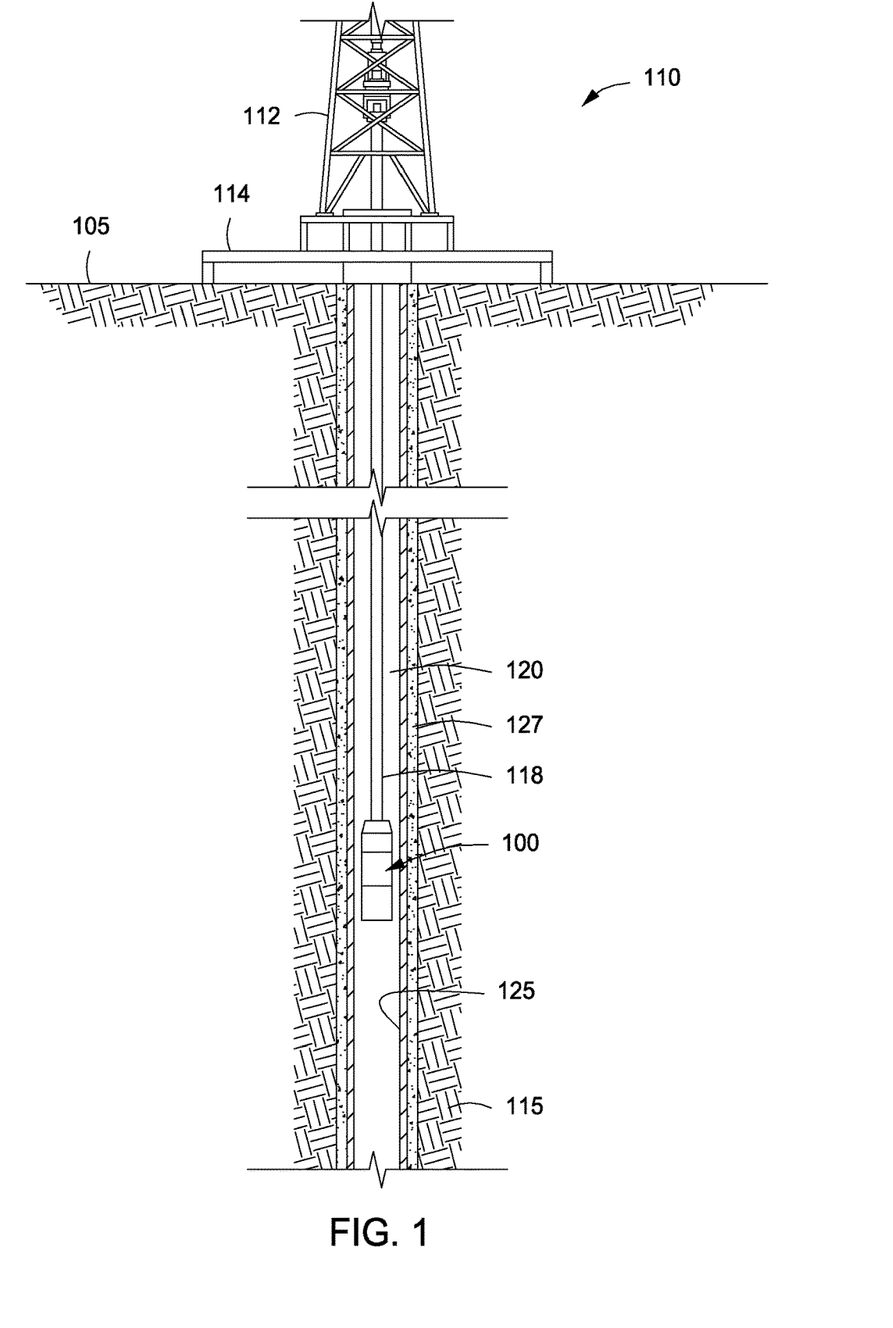
FIG. 1 illustrates a cross-sectional view of a well system comprising a downhole tool, according to one or more embodiments described herein.

Referring now to FIG. 1, illustrated is an exemplary well system 110 for a downhole tool 100. As depicted, a derrick 112 with a rig floor 114 is positioned on the earth's surface 105. A wellbore 120 is positioned below the derrick 112 and the rig floor 114 and extends into subterranean formation 115. As shown, the wellbore may be lined with casing 125 that is cemented into place with cement 127. It will be appreciated that although FIG. 1 depicts the wellbore 120 having a casing 125 being cemented into place with cement 127, the wellbore 120 may be wholly or partially cased and wholly or partially cemented (i.e., the casing wholly or partially spans the wellbore and may or may not be wholly or partially cemented in place), without departing from the scope of the present disclosure. Moreover, the wellbore 120 may be an open-hole wellbore. A tool string 118 extends from the derrick 112 and the rig floor 114 downwardly into the wellbore 120. The tool string 118 may be any mechanical connection to the surface, such as, for example, wireline, slickline, jointed pipe, or coiled tubing. As depicted, the tool string 118 suspends the downhole tool 100 for placement into the wellbore 120 at a desired location to perform a specific downhole operation. As previously mentioned, the downhole tool 100 may be any type of wellbore zonal isolation device including, but not limited to, a frac plug, a bridge plug, a packer, a wiper plug, or a cement plug.

It will be appreciated by one of skill in the art that the well system 110 of FIG. 1 is merely one example of a wide variety of well systems in which the principles of the present disclosure may be utilized. Accordingly, it will be appreciated that the principles of this disclosure are not necessarily limited to any of the details of the depicted well system 110, or the various components thereof, depicted in the drawings or otherwise described herein. For example, it is not necessary in keeping with the principles of this disclosure for the wellbore 120 to include a generally vertical cased section. The well system 110 may equally be employed in vertical and/or deviated wellbores, without departing from the scope of the present disclosure. Furthermore, it is not necessary for a single downhole tool 100 to be suspended from the tool string 118.

In addition, it is not necessary for the downhole tool 100 to be lowered into the wellbore 120 using the derrick 112. Rather, any other type of device suitable for lowering the downhole tool 100 into the wellbore 120 for placement at a desired location may be utilized without departing from the scope of the present disclosure such as, for example, mobile workover rigs, well servicing units, and the like. Although not depicted, the downhole tool 100 may alternatively be hydraulically pumped into the wellbore and, thus, not need the tool string 118 for delivery into the wellbore 120.

Although not depicted, the structure of the downhole tool 100 may take on a variety of forms to provide fluid sealing between two wellbore sections. The downhole tool 100, regardless of its specific structure as a specific type of wellbore zonal isolation device, comprises a body and a sealing element. Both the body and the sealing element may each be composed of the same material. Generally, however, the body provides structural rigidity and other mechanical features to the downhole tool 100 and the sealing element is a resilient (i.e., elastic) material capable of providing a fluid seal between two sections of the wellbore 120.

Figure 2:
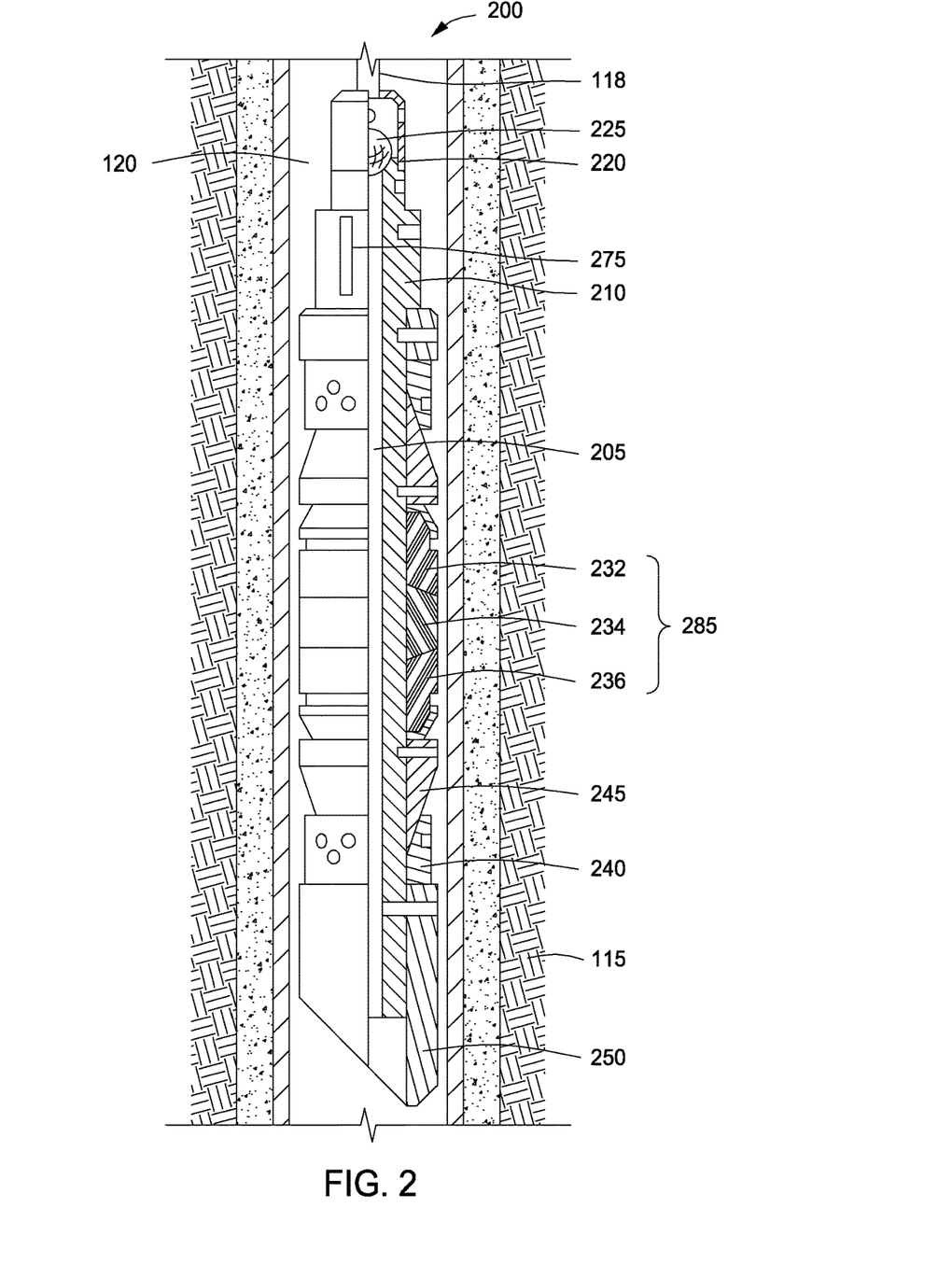
FIG. 2 depicts an enlarged cross-sectional view of a downhole tool, according to one or more embodiments described herein.

Referring now to FIG. 2, with continued reference to FIG. 1, one specific type of downhole tool described herein is a frac plug wellbore zonal isolation device for use during a well stimulation/fracturing operation. FIG. 2 illustrates a cross-sectional view of an exemplary frac plug 200 being lowered into a wellbore 120 on a tool string 118. As previously mentioned, the frac plug 200 generally comprises a body 210 and a sealing element 285. In some embodiments, the sealing element 285 may be resilient and have a Shore A durometer hardness in an amount of from about 60 to about 100, encompassing any value and subset therebetween. For example, the sealing element 285 may have a Shore A durometer hardness in an amount of from about 70 to about 90, or of from about 70 to about 80, or from about 75 to about 85, encompassing any value and subset therebetween. For example, in some embodiments, the sealing element 285 may be resilient and have a Shore A durometer hardness of from about 75 to about 95. Each of these values is critical to the embodiments of the present disclosure and may depend on a number of factors including, but not limited to, the material selected to form the sealing element 285, the operation to be performed by the downhole tool 100 (FIG. 1), the type of downhole tool 100, and the like.

The sealing element 285, as depicted, comprises an upper sealing element 232, a center sealing element 234, and a lower sealing element 236. It will be appreciated that although the sealing element 285 is shown as having three portions (i.e., the upper sealing element 232, the center sealing element 234, and the lower sealing element 236), any other number of portions, or a single portion, may also be employed without departing from the scope of the present disclosure.

As depicted, the sealing element 285 is extending around the body 210; however, it may be of any other configuration suitable for allowing the sealing element 285 to form a fluid seal in the wellbore 120, without departing from the scope of the present disclosure. For example, in some embodiments, the body may comprise two sections joined together by the sealing element, such that the two sections of the body compress to permit the sealing element to make a fluid seal in the wellbore 120 (i.e., a compression set downhole tool). Other such configurations are also suitable for use in the embodiments described herein. Moreover, although the sealing element 285 is depicted as located in a center section of the body 210, it will be appreciated that it may be located at any location along the length of the body 210, without departing from the scope of the present disclosure.

The body 210 of the frac plug 200 comprises an axial flowbore 205 extending therethrough. A cage 220 is formed at the upper end of the body 210 for retaining a ball 225 that acts as a one-way check valve. In particular, the ball 225 seals off the flowbore 205 to prevent flow downwardly therethrough, but permits flow upwardly through the flowbore 205. One or more slips 240 are mounted around the body 210 below the sealing element 285. The slips 240 are guided by a mechanical slip body 245. A tapered shoe 250 is provided at the lower end of the body 210 for guiding and protecting the frac plug 200 as it is lowered into the wellbore 120. An optional enclosure 275 for storing a chemical solution may also be mounted on the body 210 or may be formed integrally therein. In one embodiment, the enclosure 275 is formed of a frangible material.

At least a portion of the body 210 and the sealing element 285 may be composed of a degradable material. Specifically, the sealing element 285 may be at least partially composed of an aqueous-degradable elastomer, as described in detail below that hydrolytically degrades, at least in part, in the presence of an aqueous fluid, such as preexisting aqueous fluids or introduced aqueous fluids in a wellbore environment. As used herein, the term "hydrolytic degradation" refers to the degradation of a material by cleavage of chemical bonds in the presence (e.g., by the addition of) an aqueous fluid. That is, the aqueous-degradable elastomer forming at least a portion of the sealing element 285 may wholly degrade or partially degrade; however, the amount of degradation is capable of causing the sealing element 285 to no longer maintain a fluid seal in the wellbore capable of maintaining differential pressure. The aqueous fluid that may degrade the aqueous-degradable elastomer may include, but is not limited to, fresh water, saltwater (e.g., water containing one or more salts dissolved therein), brine (e.g., saturated salt water), seawater, or combinations thereof.

The hydrolytic degradation of the aqueous-degradable elastomer forming at least a portion of the aqueous-degradable sealing element 285 and/or the degradation of the degradable portion of the body 210 may be by a number of mechanisms. For example, the degradation may be by swelling, dissolving, undergoing a chemical change, undergoing thermal degradation in combination with any of the foregoing, and any combination thereof. Degradation by swell involves the absorption by the aqueous-degradable elastomer or other degradable material of a fluid (e.g., an aqueous fluid) in the wellbore environment such that the mechanical properties of the elastomer or material degrade. That is, the aqueous-degradable elastomer or degradable material continues to absorb the fluid until its mechanical properties are no longer capable of maintaining the integrity of the aqueous-degradable elastomer or degradable material and it at least partially falls apart. In some embodiments, the aqueous-degradable elastomer or other degradable material may be designed to only partially degrade by swelling in order to ensure that the mechanical properties of the sealing element 285 and/or body 210 formed from the aqueous-degradable elastomer or other degradable material is sufficiently capable of lasting for the duration of the specific operation in which it is utilized (e.g., of maintaining a seal). Degradation by dissolving involves use of an aqueous-degradable elastomer or other degradable material that is soluble or otherwise susceptible to fluids (e.g., aqueous fluids), such that the fluid is not necessarily incorporated into the elastomer or degradable material (as is the case with degradation by swelling), but becomes soluble upon contact with the fluid. Degradation by undergoing a chemical change may involve breaking the bonds of the backbone of the aqueous-degradable elastomer (e.g., polymer backbone) or degradable material, or causing the bonds of the aqueous-degradable elastomer or degradable material to crosslink, such that elastomer or material becomes brittle and breaks into small pieces upon contact with even small forces expected in the wellbore environment. Thermal degradation involves a chemical decomposition due to heat, such as the heat present in a wellbore environment. Thermal degradation of some aqueous-degradable elastomers and/or degradable material described herein may occur at wellbore environment temperatures of greater than about 70° C. (or about 158° F.). Thermal degradation may work in concert with one or more of the other degradation methods described herein. Additionally, combinations of any of these degradation methods may occur for any given aqueous-degradable elastomer and/or degradable material for use in forming all or a portion of the downhole tools described herein.

The degradation rate of the aqueous-degradable elastomer forming the sealing element 285 may be accelerated, rapid, or normal, as defined herein. Accelerated degradation may be in the range of from about 2 hours to about 36 hours, encompassing any value or subset therebetween. Rapid degradation may be in the range of from about 36 hours to about 14 days, encompassing any value or subset therebetween. Normal degradation may be in the range of from about 14 days to about 120 days, encompassing any value or subset therebetween. Accordingly, the degradation may be of from about 120 minutes to about 120 days, or about 2 hours to about 36 hours, or 36 hours to about 14 days, or about 14 days to about 120 days, encompassing any value and subset therebetween. Each of these values is critical and depend on a number of factors including, but not limited to, the type of aqueous-degradable elastomer selected, the conditions of the wellbore environment, the amount of carbodiimide in the aqueous-degradable material, as described below, the amount of contact with an aqueous fluid, and the like.

The aqueous-degradable elastomer forming at least a portion of the aqueous-degradable sealing element 285 may be a material having less than 1 part by weight per hundred parts of the elastomer resin (phr) of carbodiimide, as described below. Carbodiimides are hydrolysis inhibitors and are typically added to elastomers (e.g., the aqueous-degradable elastomer types described herein) to prevent hydrolytic degradation thereof. Accordingly, the presence of carbodiimide is typically preferred, and in increased amounts, in an elastomer to stabilize the elastomer (e.g., from degradation due to certain factors including aqueous fluid contact, temperature, and the like). For example, when the aqueous-degradable elastomer is a polyester-based polyurethane rubber, the tensile strength of the polyurethane rubber is drastically increased over short (70 hours) and long (7 days) periods of time in contact with water, as shown in Table 1 below, where the reduction of tensile strength is indicated by a minus sign (−), based on the polyester-based polyurethane rubber MILLATHANE® 5004, available from TSE Industries, Inc. in Clearwater, Fla. Moreover, the longer the exposure to the water, the greater the degradation.

TABLE 1

| | 0% Carbodiimide | 1% Carbodiimide | 2% Carbodiimide | 5% Carbodiimide |
|---|---|---|---|---|
| 70 hrs in 100° C. | −76% tensile | −23% tensile | −23% tensile | −13% tensile |
| 7 days in 100° C. | −100% tensile | −79% tensile | −27% tensile | −19% tensile |

As a further example on the effect of carbodiimides on aqueous-degradable elastomers, and further using polyurethane rubber as an example, during the hydrolytic degradation of polyurethane rubber, the ester molecule of the polymer is cleaved by the action of water to produce a carboxylic acid and an alcohol. Once initiated, the hydrolytic reaction accelerates auto-catalytically. Carbodiimide, a hydrolytic reaction inhibitor (also referred to as stabilizer), reacts with the cleaved products (carboxylic acid or water) and creates urea compound(s) that have a minimal impact on the stabilized material. Accordingly, these stabilizers are typically important to ensure stability and degradation resistances to such aqueous-degradable elastomers.

Similarly, and as another non-limiting example, the hydrolytic degradability of polylactic acid, another aqueous-degradable elastomer for use in the embodiments of the present disclosure is inhibited by increased amounts of carbodiimide. For example, inclusion of CARBOLITE™, a thermoplastic powder containing carbodiimide, available from Hisshinbo Chemicals, Inc. in Tokyo, Japan, with polylactic acid aqueous-degradable elastomer enhances degradation inhibition and strength retention over a significant amount of time compared to no carbodiimide, upwards of 100% greater Accordingly, carbodiimides may impart a level of stability to an elastomer and inhibit hydrolytic degradation, as shown above. The present disclosure provides aqueous-degradable elastomers for forming a portion of the aqueous-degradable sealing element 285 (and, in some instances, also a portion of the body 210) comprising an amount of carbodiimides that beneficially imparts stability to the elastomer, without hindering the hydrolytic degradation thereof unduly. That is, the amount of carbodiimides in the aqueous-degradable elastomers of the present disclosure strikes a balance such that the aqueous-degradable elastomers are not immune from degradation, but do not readily degrade prior to completion of a subterranean formation. Accordingly, the designed amount of carbodiimides included in a particular aqueous-degradable elastomer may depend on a number of factors including, but not limited to, the desired degradation rate, the type of material of the aqueous-degradable elastomer, the wellbore environment in which the aqueous-degradable elastomer is exposed, and the like. Thus, each value provided below is critical to the embodiments of the present disclosure, each affecting the stability and degradability of the aqueous-degradable elastomer, whereas values outside of the disclosed range of carbodiimide amount are suboptimal or incapable of being used in the embodiments described herein for use in forming a degradable sealing element in a downhole tool (or as part of the body of a downhole tool).

In some embodiments, the carbodiimide amount is present in the aqueous-degradable elastomers described herein in an amount of from 0.05 phr to 1 phr, encompassing any value and subset therebetween. For example, in some embodiments, a lesser amount of carbodiimide may be used to enhance the degradation rate (i.e., increase the degradation rate) such that the carbodiimide is present in the aqueous-degradable elastomer in the range of from 0.05 phr to 0.5 phr, or in the range of from 0.05 phr to 0.3 phr, or in the range of from 0.05 phr to 0.1 phr, encompassing any value and subset therebetween. Each of these, as discussed above, is critical to the embodiments described herein such that the aqueous-degradable elastomer exhibits sufficient stability for use in forming a portion of a downhole tool and degrades over a time period that permits completion of a subterranean formation operation, as described herein.

Carbodiimide (also referred to in the art as methanediimine) is a functional group consisting of the formula RN=C=NR', wherein R and R' are the same or different and are an alkyl group, an alkenyl group, aryl group, or a substituted group thereof, each having between 1 and 30 carbon atoms. These groups may be aromatic, straight chain, branched, or cyclic groups, without departing from the scope of the present disclosure. One or more than one type of carbodiimide may be included in the aqueous-degradable elastomers of the present disclosure provided that the total amount of carbodiimide is less than 1 phr, as described herein.

In some embodiments, R and/or R' may be an alkyl group including, but not limited to, methyl, ethyl, n-propyl, isopropyl, n-butyl, isobutyl, secbutyl, tert-t-butyl, n-amyl, neopentyl, isoamyl, n-hexyl, isohexyl, heptyl, octyl, decyl, dodecyl, tetradecyl, octadecyl, cyclopentyl, cycloheptyl, cyclohexyl, cyclo-octyl, and the like, and any combination thereof; or a substituted alkyl group including, but not limited to, 3-chloropropyl, 2-ethoxyethyl, benzyl, 4-methylcyclohexyl, 4-chlorocyclohexyl, beta-phenylethyl, and the like, and any combination thereof. In other embodiments, R and/or R' may be an alkenyl group including, but not limited to, vinyl, isopropenyl, methallyl, buten-2-yl, buten-3-yl, penten-1-yl, hexenyl, heptenyl, octenyl, decenyl, dodecenyl, tetradecenyl, ocadecenyl, and any combination thereof; or a substituted alkenyl group including, but not limited to, 4-chloro-2-butenyl, chloroallyl, 4-phenyl-3-butenyl, and the like, and any combination thereof. Suitable aryl groups for R and/or R' may include, but are not limited to, phenyl, naphthyl, anthryl, phenanthryl, and the like, and any combination thereof; or a substituted aryl group including, but not limited to, chlorophenyl, biphenyl, anisyl, tolyl, xylyl, p-nonylphenyl, p-styryl, and the like, and any combination thereof.

The carbodiimides included in the aqueous-degradable elastomers of the present disclosure may be monomeric or polymeric and may include any carbodiimide provided that it is present in the aqueous-degradable elastomer described herein in an amount of less than 1 phr. Polycarbodiimides may have the structure of Formula I:

Formula I where R, $R_1$, and $R_2$ are the same or different and any of the above referenced R and/or R' groups, and n is an integer between 1 and 1000.

Specific examples of some carbodiimides that may be present in the aqueous-degradable elastomers of the present disclosure may include, but are not limited to, diphenyl carbodiimide, dicyclohexyl carbodiimide, diallyl carbodiimide, dibenzyl carbodiimide, bis(p-chlorophenyl)carbodiimide, bis(p-bromophenyl)carbodiimide, bis(2-bromoallyl)carbodiimide, bis(p-dimethylaminophenyl)carbodiimide, bis(p-methoxyphenyl)carbodiimide, diethyl carbodiimide, di-1-phenanthryl carbodiimide; di-polycarbodiimide; didodecylcarbodiimide, di-sec-butyl carbodiimide, bis(4-biphenyl)carbodiimide, tert-butyl methylcarbodiimide, cyclohexyl phenylcarbodiimide, ethyl phenyl carbodiimide, phenyl 1-naphthyl carbodiimide, allyl ethyl carbodiimide, allyl n-octylcarbodiimide, allyl phenyl carbodiimide, benzyl phenyl carbodiimide, and the like and any combination thereof.

The aqueous-degradable elastomer for use in forming any or all of the aqueous-degradable sealing element 285 (and if applicable any or all of the body 210) may be of a material including, but not limited to, a material comprising ester linkages. Examples of suitable aqueous-degradable elastomers may include, but are not limited to, a polyurethane rubber (e.g., cast polyurethanes, thermoplastic polyurethanes, polyethane polyurethanes), a polyester-based polyurethane rubber (e.g., lactone polyester-based thermoplastic polyurethanes), a polyether-based polyurethane rubber, a polylactic acid polymer, a polybutylene succinate polymer, a polyhydroxy alkanoic acid polymer, a starch-based resin (e.g., starch-poly(ethylene-co-vinyl alcohol), starch-polyvinyl alcohol, starch-polylactic acid, starch-polycaprolactone, starch-poly(butylene succinate), and the like), a polyethylene terephthalate polymer, a polyester thermoplastic (e.g., polyether/ester copolymers, polyester/ester copolymers, and the like), a polybutylene terephthalate polymer, and any combination thereof.

In some embodiments, the aqueous-degradable elastomer selected for use in forming the downhole tools described herein (e.g., the aqueous-degradable sealing element 285) may be a polyurethane rubber, a polyester-based polyurethane rubber, or a polyether-based polyurethane rubber (collectively simply "polyurethane-based rubbers). These polyurethane-based rubbers degrade in water through a hydrolytic reaction. As discussed above, traditional polyurethane-based rubbers typically have stabilizers, such as carbodiimide, included therein to minimize the hydrolytic degradation reaction. Polyurethane-based rubbers traditionally are formed by reacting a polyisocyanate with a polyol. In the embodiments described herein, although non-limiting, the polyol for forming a polyurethane-based rubber may be a natural oil polyol, a polyester polyol (e.g., polybutadienes (e.g., polybutanediol adipate), polycaprolactones, polycarbonates, and the like), or a polyether polyol (e.g., polytetramethylene ether glycol, polyoxypropylene-glycol, polyoxyethylene glycol, and the like). Because polyether polyols are typically hydrolytically more reactive than polyester polyols and natural oil polyols, polyether polyols may be preferred, particularly when the degradation of the aqueous-degradable elastomer is solely based on aqueous fluid contact and not additionally other degradation stimuli. However, either polyol may be used to form the polyurethane-based rubber for use as the aqueous-degradable elastomer, and each is critical to the embodiments described herein, as the amount of desired degradation over time may depend on a number of factors including the conditions of the subterranean formation, the subterranean formation operation being performed, and the like. Combinations of these polyols may also be used, without departing from the scope of the present disclosure.

Accordingly, the rate of hydrolytic degradation of a polyurethane-based rubber for use as the aqueous-degradable elastomers described herein may be adjusted and controlled based on the order of the polyol addition, as well as the polyol properties and quantities. As an example, in some embodiments, the amount of polyol included in an amount in the range of from about 0.25 to about 2 stoichiometric ratio of the polyisocyanate in the polyurethane-based rubber, encompassing any value and subset therebetween. For example, the amount of polyol included may be in an amount in the range of from about 0.25 to about 1.75, or about 0.5 to about 1.5, or about 0.75 to about 1 stoichiometric ratio of the polyisocyanate in the polyurethane-based rubber, encompassing any value and subset therebetween. Each of these values is critical to the embodiments described herein and may depend on a number of factors including, but not limited to, the desired hydrolytic degradation rate, the type of polyol(s) selected, the type of subterranean operation being performed, and the like.

In some embodiments, where the aqueous-degradable elastomer selected is a polyurethane-based rubber for use in the aqueous-degradable sealing element 285, the inclusion of a low functionality initiator may impart flexibility to the sealing element 285. Such low functionality initiators may include, but are not limited to dipropylene glycol, glycerine, sorbitol/water solution, and any combination thereof. As used herein, the term "low functionality initiator," and grammatical variants thereof, refers to the average number of isocyanate reactive sites per molecule in the range of from about 1 to about 5, encompassing any value and subset therebetween. For example, the average number of isocyanate reactive sites per molecule may be of from about 1 to about 3, or about 3 to about 5, encompassing any value and subset therebetween. These low functionality initiators impart flexibility to the sealing element 285 and may be included in the polyurethane-based rubbers described herein in an amount in the range of from about 1% to about 50% by weight of the polyol in the polyurethane-based rubber, encompassing any value and subset therebetween. For example, the polyurethane-based rubbers described herein in an amount in the range of from about 1% to about 10%, or about 10% to about 25%, or about 25% to about 35%, or about 35% to about 50% by weight of the polyol in the polyurethane-based rubber, encompassing any value and subset therebetween. Additionally, in some embodiments, higher molecular weight polyols for use in forming the polyurethane-based rubbers described herein may impart flexibility to the aqueous-degradable sealing element 285 described herein. For example, in some embodiments, the molecular weight of the selected polyols may be in the range of from about 200 Daltons (Da) to about 20000 Da, encompassing any value and subset therebetween. For example, the molecular weight of the selected polyols may be in the range of from about 200 Da to about 5000 Da, or about 5000 Da to about 10000 Da, or about 10000 Da to about 15000 Da, or about 15000 Da to about 20000 Da, encompassing any value and subset therebetween. Each of these values is critical to the embodiments described herein and may depend on a number of factors including, but not limited to, the desired flexibility of the aqueous-degradable elastomer (and thus, e.g., the aqueous-degradable sealing element 285), the type of subterranean formation operation being performed, the conditions in the subterranean formation, and the like.

In some embodiments, the aqueous-degradable elastomer forming the sealing element 285 (and in some cases at least a portion of the body 210) may have a thermoplastic polymer embedded therein. The thermoplastic polymer may modify the strength, resiliency, or modulus of the sealing element 285 and may also control the degradation rate of the sealing element 285. Suitable thermoplastic polymers may include, but are not limited to, polypropylene, an aliphatic polyester (e.g., polyglycolic acid, polylactic acid, polycaprolactone, polyhydroxyalkanoate, polyhydroxyalkanoiate, polyhydroxybutyrate, polyethylene adipate, polybutylene succinate, poly(lactic-co-glycolic) acid, poly(3-hydroxybutyrate-co-3-hydroxyvalerate, polycarbonate, and the like), and any combination thereof. In some situations, as stated above, the aqueous-degradable elastomer may be a thermoplastic, which may be combined with one or more aqueous-degradable elastomers (in combination) or a thermoplastic listed above. The amount of thermoplastic polymer that may be embedded in the aqueous-degradable elastomer forming the sealing element 285 may be any amount that confers a desirable elasticity without affecting the desired amount of degradation. In some embodiments, the thermoplastic polymer may be included in an amount of from about 1% to about 91% by weight of the aqueous-degradable elastomer, encompassing any value or subset therebetween. For example, the thermoplastic polymer may be included in an amount of from about 1% to about 30%, or about 30% to about 60%, or about 60% to about 91% by weight of the aqueous-degradable elastomer, encompassing any value and subset therebetween. Each of these values is critical to the embodiments described herein and may depend on a number of factors including, but not limited to, the desired flexibility of the aqueous-degradable elastomer, the desired degradation rate of the aqueous-degradable elastomer, the conditions of the subterranean formation, the subterranean formation operation being performed, and the like.

The aqueous-degradable elastomer forming the sealing element 285 (and in some instances at least a portion of the body 210) may in some cases further comprise an additive that may further influence the strength or resiliency of the sealing element 285 and, in some cases, affect the degradability or degradation rate, tensile strength, storage moduli, and/or permeability (i.e., the ability for water to enter the polymer and degrade the chains) of the sealing element 285. Suitable additives may include, but are not limited to, an organophilic clay, silica, a metal oxide, carbon black, and any combination thereof. In some embodiments, the additive may be included in an amount in the range of from about 1% to about 91% by weight of the aqueous-degradable elastomer, encompassing any value or subset therebetween. For example, additive may be included in an amount of from about 1% to about 30%, or about 30% to about 60%, or about 60% to about 91% by weight of the aqueous-degradable elastomer, encompassing any value and subset therebetween. Each of these values is critical to the embodiments described herein and may depend on a number of factors including, but not limited to, the desired flexibility of the aqueous-degradable elastomer, the desired degradation rate of the aqueous-degradable elastomer, the conditions of the subterranean formation, the subterranean formation operation being performed, and the like.

In some embodiments, the aqueous-degradable sealing element 285 may be at least partially encapsulated in a second material (e.g., a "sheath") formed from an encapsulating material capable of protecting or prolonging degradation of the sealing element 285 in a wellbore environment comprising an aqueous fluid (and any additional stimuli). As used herein, the term "at least partially encapsulated" with reference to an encapsulating material, means that at least 50% of an outer surface of a component of a downhole tool (i.e., the sealing element or a component of the body) is covered with the encapsulating material. The sheath may also serve to protect the sealing element 285 from abrasion within the wellbore 120. The structure of the sheath may be permeable, frangible, or of a material that is at least partially removable at a desired rate within the wellbore environment. Whatever the structure, the sheath is designed such that it does not interfere with the ability of the sealing element 285 to form a fluid seal in the wellbore 120. The encapsulating material forming the sheath may be any material capable of use in a downhole environment and, depending on the structure of the sheath may, or may not, be elastic such that it expands with the sealing element 285. For example, a frangible sheath may break as the sealing element 285 expands to form a fluid seal, whereas a permeable sheath may remain in place on the sealing element 285 as it forms the fluid seal. As used herein, the term "permeable" refers to a structure that permits fluids (including liquids and gases) therethrough and is not limited to any particular configuration.

The encapsulating material forming the sheath may be of any material that the sealing element 285 itself may be made of, as described above, including aqueous-degradable materials having thermoplastic polymers and/or additives embedded therein. For example, the sheath may be made of an aqueous-degradable material that degrades faster than the aqueous-degradable material forming the sealing element 285. Other suitable encapsulating materials may include, but are not limited to, a wax, a drying oil, a polyurethane, a crosslinked partially hydrolyzed polyacrylic, a silicate material, a glass material, an inorganic durable material, a polymer, a polylactic acid, a polyvinyl alcohol, a polyvinylidene chloride, and any combination thereof.

In some embodiments, as described above, the body 210, or a portion thereof, may also be composed of a degradable material, including the aqueous-degradable elastomers described herein. Unlike the sealing element 285, however, the body 210 is sufficiently rigid to provide structural integrity to the downhole tool, or frac plug 200. The body 210 may degrade in the wellbore environment such as when exposed to an aqueous fluid, an elevated wellbore temperature, and/or a hydrocarbon fluid, or by any mechanism previously discussed. The aqueous fluid may be any aqueous fluid present in the wellbore environment including, but not limited to, those listed above: fresh water, saltwater, brine, seawater, or combinations thereof. The body 210 may thermally degrade in a wellbore environment having temperatures greater than about 93° C. (or about 200° F.). The body 210 may also degrade upon contact with a hydrocarbon fluid in the wellbore environment. In such cases, the hydrocarbon fluid may include, but is not limited to, alkanes, olefins, aromatic organic compounds, cyclic alkanes, paraffins, diesel fluids, mineral oils, desulfurized hydrogenated kerosenes, and any combination thereof. Suitable materials for forming the body 210 may include, but are not limited to, a polysaccharide, chitin, chitosan, a protein, an aliphatic polyester, poly(ε-caprolactone), a poly(hydroxybutyrate), poly(ethyleneoxide), poly(phenyllactide), a poly(amino acid), a poly(orthoester), polyphosphazene, a polylactide, a polyglycolide, a poly(anhydride) (e.g., poly(adipic anhydride), poly(suberic anhydride), poly(sebacic anhydride), poly(dodecanedioic anhydride), poly(maleic anhydride), and poly(benzoic anhydride), and the like), a polyepichlorohydrin, a copolymer of ethylene oxide/polyepichlorohydrin, a terpolymer of epichlorohydrin/ethylene oxide/allyl glycidyl ether, and any combination thereof. Suitable materials for forming the body 210 may also include, but are not limited to, metals or metal alloys that include magnesium, aluminum, iron, nickel, copper, gallium, zinc, zirconium, and the like, and any combination thereof. In some embodiments, metals or metal alloys comprising magnesium or aluminum may form the body 210 for degradation in a wellbore environment. Combinations of the foregoing polymers and metals/metal alloys may be used in forming the body 210.

In some embodiments, the body 210 may release an accelerant during degradation that accelerates the degradation of the sealing element 285. In other embodiments, the sealing element 285 may release an accelerant that accelerates the degradation of the body 210. In some cases, the accelerant is a natural component that is released upon degradation of either the body 210 or the sealing element 285, such as an acid (e.g., release of an acid upon degradation of the body 210 formed from a polylactide). Similarly, the body 210 may release a base that would aid in degrading the sealing element 285, such as, for example, if the body 210 were composed of a galvanically reacting material. In other cases, the accelerant may be embedded in the material forming either or both of the body 210 and the sealing element 285. The accelerant may be in any form, including a solid or a liquid.

Suitable accelerants may include, but are not limited to, a crosslinker, sulfur, a sulfur releasing agent, a peroxide, a peroxide releasing agent, a catalyst, an acid releasing agent, a base releasing agent, and any combination thereof. In some embodiments, the accelerant may cause the body 210 or the sealing element 285 to become brittle to aid in degradation. Specific accelerants may include, but are not limited to, a polylactide, a polyglycolide, an ester, a cyclic ester, a diester, an anhydride, a lactone, an amide, an anhydride, an alkali metal alkoxide, a carbonate, a bicarbonate, an alcohol, an alkali metal hydroxide, ammonium hydroxide, sodium hydroxide, potassium hydroxide, an amine, an alkanol amine, an inorganic acid or precursor thereof (e.g., hydrochloric acid, hydrofluoric acid, ammonium bifluoride, and the like), an organic acid or precursor thereof (e.g., formic acid, acetic acid, lactic acid, glycolic acid, aminopolycarboxylic acid, polyaminopolycarboxylic acid, and the like), and any combination thereof.

The accelerant, when embedded in the body 210 or the sealing element 285, may be present in the range of from about 0.01% to about 25% by weight of the material forming the body 210 or the sealing element 285. For example, the accelerant may be present of from about 0.01% to about 5%, or about 5% to about 10%, or about 10% to about 25% by weight of the material forming the body 210 or the sealing element 285, encompassing any value and subset therebetween. Each of these values is critical to the embodiments of the present disclosure and may depend on a number of factors including, but not limited to, the material forming the body 210 and/or the sealing element 285, the desired degradation rate of the body 210 and/or the sealing element 285, and the like, and any combination thereof.

Each of the individual components forming the body 210 and the sealing element 285 (i.e., the primary material and any additional material embedded therein) is preferably present in the body 210 and the sealing element 285 uniformly (i.e., distributed uniformly throughout each component). The choices and relative amounts of each component are adjusted for the particular downhole operation (e.g., fracturing, workover, and the like) and the desired degradation rate (i.e., accelerated, rapid, or normal) of the body 210 and/or sealing element 285. Factors that may affect the selection and amount of components may include, for example, the temperature of the subterranean formation in which the downhole operation is being performed, the expected amount of aqueous and/or hydrocarbon fluid in the wellbore environment, the amount of elasticity required for the sealing element 285 (e.g., based on wellbore diameter, for example), the duration of the downhole operation, and the like.

Figure 3:
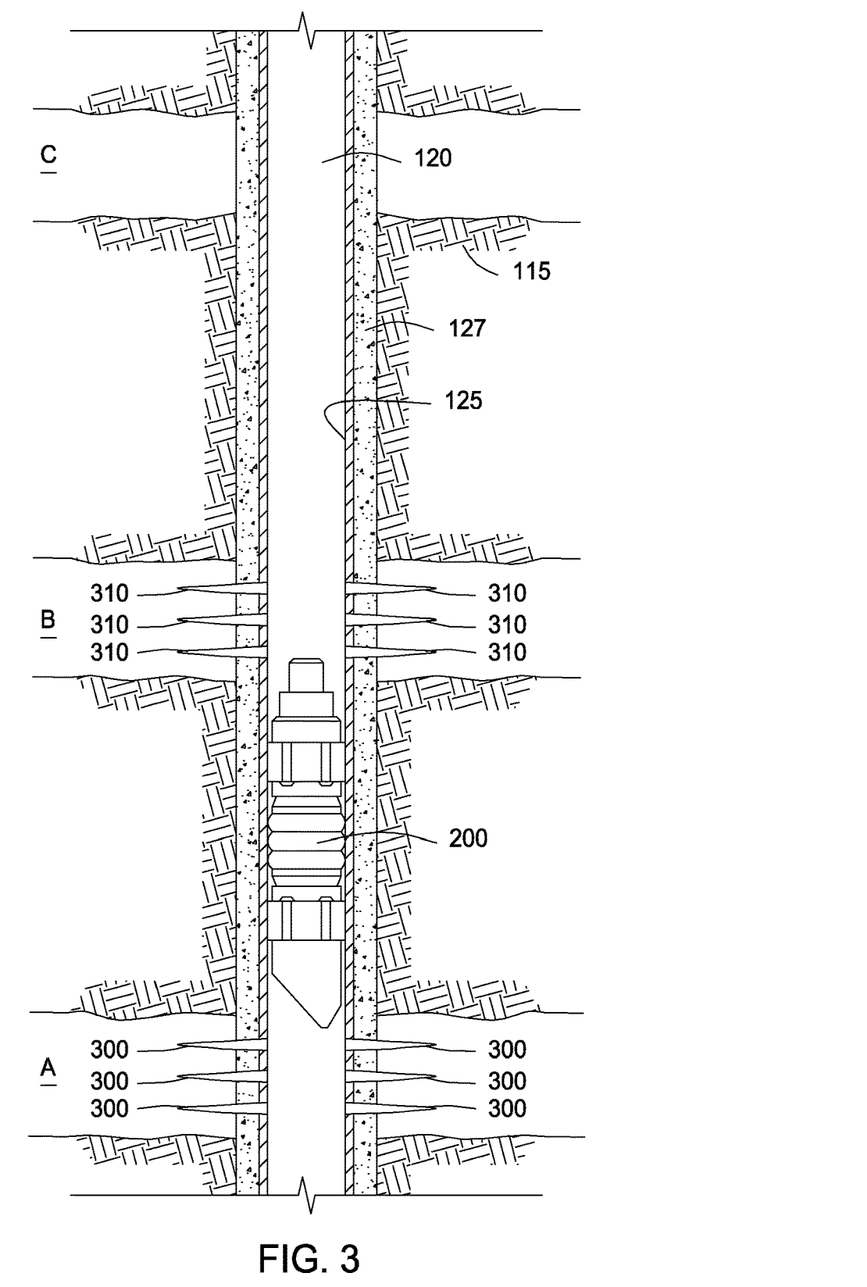
FIG. 3 shows an enlarged cross-sectional view of a downhole tool in operation, according to one or more embodiments described herein.

Referring again to FIG. 2, in operation the frac plug 200 may be used in a downhole fracturing operation to isolate a zone of the formation 115 below the frac plug 200. Referring now to FIG. 3, with continued reference to FIG. 2, the frac plug 200 is shown disposed between producing zone A and producing zone B in formation 115. In a conventional fracturing operation, before, after, or in conjunction with setting the frac plug 200 to isolate zone A from zone B, a plurality of perforations 300 are made by a perforating tool (not shown) through the casing 125 and cement 127 to extend into producing zone A. Then a well stimulation fluid is introduced into the wellbore 120, such as by lowering a tool (not shown) into the wellbore 120 for discharging the fluid at a relatively high pressure or by pumping the fluid directly from the derrick 112 (FIG. 1) into the wellbore 120. The well stimulation fluid passes through the perforations 300 into producing zone A of the formation 115 for stimulating the recovery of fluids in the form of oil and gas containing hydrocarbons. These production fluids pass from zone A, through the perforations 300, and up the wellbore 120 for recovery at the surface 105 (FIG. 1).

The frac plug 200 is then lowered by the tool string 118 (FIG. 1) to the desired depth within the wellbore 120, and the sealing element 285 (FIG. 2) is set against the casing 125, thereby isolating zone A as depicted in FIG. 3. Due to the design of the frac plug 200, the flowbore 205 (FIG. 2) of the frac plug 200 allows fluid from isolated zone A to flow upwardly through the frac plug 200 while preventing flow downwardly into the isolated zone A. Accordingly, the production fluids from zone A continue to pass through the perforations 300, into the wellbore 120, and upwardly through the flowbore 205 of the frac plug 200, before flowing into the wellbore 120 above the frac plug 200 for recovery at the surface 105.

After the frac plug 200 is set into position, as shown in FIG. 3, a second set of perforations 310 may then be formed through the casing 125 and cement 127 adjacent intermediate producing zone B of the formation 115. Zone B is then treated with well stimulation fluid, causing the recovered fluids from zone B to pass through the perforations 310 into the wellbore 120. In this area of the wellbore 120 above the frac plug 200, the recovered fluids from zone B will mix with the recovered fluids from zone A before flowing upwardly within the wellbore 120 for recovery at the surface 105.

If additional fracturing operations will be performed, such as recovering hydrocarbons from zone C, additional frac plugs 200 may be installed within the wellbore 120 to isolate each zone of the formation 115. Each frac plug 200 allows fluid to flow upwardly therethrough from the lowermost zone A to the uppermost zone C of the formation 115, but pressurized fluid cannot flow downwardly through the frac plug 200.

After the fluid recovery operations are complete, the frac plug 200 must be removed from the wellbore 120. In this context, as stated above, at least a portion of the sealing element 285 and/or body 210 (FIG. 2) of the frac plug 200 may degrade by exposure to the wellbore environment. For example, the sealing element 285 and/or the body 210 may degrade upon contact or prolonged contact with aqueous fluids present naturally or introduced in the wellbore 120. Other combinations of degradability are suitable, without departing from the scope of the present disclosure, as discussed above, for example.

Accordingly, in an embodiment, the frac plug 200 is designed to decompose over time while operating in a wellbore environment, thereby eliminating the need to mill or drill the frac plug 200 out of the wellbore 120. Thus, by exposing the frac plug 200 to an aqueous fluid, at least some of its components will decompose, causing the frac plug 200 to lose structural and/or functional integrity and release from the casing 125. The remaining components of the frac plug 200 will simply fall to the bottom of the wellbore 120. In various alternate embodiments, degrading one or more components of a downhole tool 100 performs an actuation function, opens a passage, releases a retained member, or otherwise changes the operating mode of the downhole tool 100. Also, as described above, the material or components embedded therein for forming the body 210 and sealing element 285 of the frac plug 200, as well as the use of the optional sheath, may be selected to control the decomposition rate of the frac plug 200.

Referring again to FIG. 1, removing the downhole tool 100 from its attachment in the wellbore 120 is more cost effective and less time consuming than removing conventional downhole tools, which require making one or more trips into the wellbore 120 with a mill or drill to gradually grind or cut the tool away. Instead, the downhole tools 100 described herein are removable by simply exposing the tools 100 to a naturally occurring or standard downhole environment (e.g., aqueous fluids present in a standard downhole operation, temperatures, and the like) over time. The foregoing descriptions of specific embodiments of the downhole tool 100, and the systems and methods for removing the biodegradable tool 100 from the wellbore 120 have been presented for purposes of illustration and description and are not intended to be exhaustive or to limit this disclosure to the precise forms disclosed. Many other modifications and variations are possible. In particular, the type of downhole tool 100, or the particular components that make up the downhole tool 100 (e.g., the body and sealing element) may be varied. For example, instead of a frac plug 200 (FIG. 2), the downhole tool 100 may comprise a bridge plug, which is designed to seal the wellbore 120 and isolate the zones above and below the bridge plug, allowing no fluid communication in either direction. Alternatively, the biodegradable downhole tool 100 could comprise a packer that includes a shiftable valve such that the packer may perform like a bridge plug to isolate two formation zones, or the shiftable valve may be opened to enable fluid communication therethrough. Similarly, the downhole tool 100 could comprise a wiper plug or a cement plug.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include Embodiment A, Embodiment B, and Embodiment C:

Embodiment A: A downhole tool comprising: a body, wherein at least a portion of the body is degradable when exposed to a wellbore environment; and at least one aqueous-degradable sealing element comprising an aqueous-degradable elastomer comprising in the range of 0.05 to 1 parts by weight per hundred parts of the elastomer (phr) of carbodiimide, wherein the aqueous-degradable sealing element hydrolytically degrades when exposed to an aqueous fluid.

Embodiment B: A method comprising: installing a downhole tool in a wellbore, the downhole tool comprising a body and at least one aqueous-degradable sealing element comprising an aqueous-degradable elastomer comprising in the range of 0.05 to 1 parts by weight per hundred parts of the elastomer (phr) of carbodiimide, wherein at least a portion of the body is degradable when exposed to a wellbore environment; fluidly sealing two sections of the wellbore with the aqueous-degradable sealing element of the downhole tool, the aqueous-degradable sealing element capable of holding a differential pressure; performing a downhole operation; and hydrolytically degrading at least a portion of the aqueous-degradable sealing element by exposure to an aqueous fluid in the wellbore environment, such that the aqueous-degradable sealing element no longer is capable of holding the differential pressure.

Embodiment C: A system comprising: a wellbore; and a downhole tool capable of being disposed in the wellbore to fluidly seal two sections thereof, the downhole tool comprising: a body, wherein at least a portion of the body is degradable when exposed to a wellbore environment; and at least one aqueous-degradable sealing element comprising an aqueous-degradable elastomer comprising in the range of 0.05 to 1 parts by weight per hundred parts of the elastomer (phr) of carbodiimide, wherein the aqueous-degradable sealing element hydrolytically degrades when exposed to an aqueous fluid.

Embodiments A, B, and C may have one or more of the following additional elements in any combination:

Element 1: Wherein the aqueous-degradable elastomer comprises in the range of 0.05 to 0.5 phr of carbodiimide.

Element 2: Wherein the aqueous-degradable elastomer comprises ester linkages.

Element 3: Wherein the aqueous-degradable elastomer is selected from the group consisting of a polyurethane rubber, a polyester-based polyurethane rubber, a polyether-based polyurethane rubber, a polylactic acid polymer, a polybutylene succinate polymer, a polyhydroxy alkanoic acid polymer, a starch-based resin, a polyethylene terephthalate polymer, a polyester thermoplastic, a polybutylene terephthalate polymer, and any combination thereof.

Element 4: Wherein the aqueous-degradable elastomer is a polyurethane rubber.

Element 5: Wherein the aqueous-degradable elastomer further comprises an additive selected from the group consisting of an organophilic clay, silica, a metal oxide, carbon black, and any combination thereof.

Element 6: Wherein downhole tool is a wellbore zonal isolation device selected from the group consisting of a frac plug, a bridge plug, a packer, a wiper plug, a cement plug, and any combination thereof.

Element 7: Wherein the downhole tool is a frac plug.

Element 8: Wherein the portion of the body that is degradable comprises a material selected from the group consisting of a polysaccharide, chitin, chitosan, a protein, an aliphatic polyester, poly(ε-caprolactone), a poly(hydroxybutyrate), poly(ethyleneoxide), poly(phenyllactide), a poly (amino acid), a poly(orthoester), polyphosphazene, a polylactide, a polyglycolide, a poly(anhydride), a polyepichlorohydrin, a copolymer of ethylene oxide/polyepichlorohydrin, a terpolymer of epichlorohydrin/ethylene oxide/allyl glycidyl ether, and any combination thereof.

Element 9: Wherein the portion of the body that is degradable comprises a metal alloy comprising magnesium or aluminum.

Element 10: Further comprising degrading at least a portion of the portion of the body that is degradable.

Element 11: Wherein the aqueous-degradable sealing element has a Shore A durometer hardness of from about 60 to about 100.

Element 12: Wherein the aqueous-degradable elastomer is a polyurethane rubber, a polyester-based polyurethane rubber, or a polyether-based polyurethane rubber, and further comprises a low functionality initiator in an amount of from about 1% to about 50% by weight of polyol therein.

Element 13: Wherein the aqueous-degradable elastomer is a polyurethane rubber, a polyester-based polyurethane rubber, or a polyether-based polyurethane rubber, and further comprises a low functionality initiator in an amount of from about 1% to about 50% by weight of polyol therein, and wherein the molecular weight of the polyol is from about 200 Da to about 20000 Da.

Element 14: Wherein the aqueous-degradable elastomer further comprises a thermoplastic polymer in an amount of from about 1% to about 91% by weight of the aqueous-degradable elastomer.

Element 15: Wherein the aqueous-degradable elastomer further comprises an additive selected from the group consisting of an organophilic clay, silica, a metal oxide, carbon black, and any combination thereof, and wherein the additive is present in an amount of from about 1% to about 91% by weight of the aqueous-degradable elastomer.

Element 16: Wherein one or both of the body and/or the aqueous-degradable sealing element comprises an accelerant of from about 0.01% to about 25% by weight of the material forming the body and/or the aqueous-degradable sealing element.

By way of non-limiting example, exemplary combinations of the above elements, which combinations are applicable to Embodiments A, B, and C, include: 1 and 2; 1 and 3; 1 and 4; 1 and 5; 1 and 6; 1 and 7; 1 and 8; 1 and 9; 1 and 10; 1 and 11; 1 and 12; 1 and 13; 1 and 14; 1 and 15; 1 and 16; 2 and 3; 2 and 4; 2 and 5; 2 and 6; 2 and 7; 2 and 8; 2 and 9; 2 and 10; 2 and 11; 2 and 12; 2 and 13; 2 and 14; 2 and 15; 2 and 16; 3 and 4; 3 and 5; 3 and 6; 3 and 7; 3 and 8; 3 and 9; 3 and 10; 3 and 11; 3 and 12; 3 and 13; 3 and 14; 3 and 15; 3 and 16; 4 and 5; 4 and 6; 4 and 7; 4 and 8; 4 and 9; 4 and 10; 4 and 11; 4 and 12; 4 and 13; 4 and 14; 4 and 15; 4 and 16; 5 and 6; 5 and 7; 5 and 8; 5 and 9; 5 and 10; 5 and 11; 5 and 12; 5 and 13; 5 and 14; 5 and 15; 5 and 16; 6 and 7; 6 and 8; 6 and 9; 6 and 10; 6 and 11; 6 and 12; 6 and 13; 6 and 14; 6 and 15; 6 and 16; 7 and 8; 7 and 9; 7 and 10; 7 and 11; 7 and 12; 7 and 13; 7 and 14; 7 and 15; 7 and 16; 8 and 9; 8 and 10; 8 and 11; 8 and 12; 8 and 13; 8 and 14; 8 and 15; 8 and 16; 9 and 10; 9 and 11; 9 and 12; 9 and 13; 9 and 14; 9 and 15; 9 and 16; 10 and 11; 10 and 12; 10 and 13; 10 and 14; 10 and 15; 10 and 16; 11 and 12; 11 and 13; 11 and 14; 11 and 15; 11 and 16; 12 and 13; 12 and 14; 12 and 15; 12 and 16; 13 and 14; 13 and 15; 13 and 16; 14 and 15; 14 and 16; 15 and 16; 1, 2, and 3; 1, 4, and 6; 2, 7, and 8, 2, 4, 9, and 10; 1, 2, 3, 4, 5, 6, 7, 8, 9, and 10; 1, 2, 3, 4, 5, 6, 7, 8, 9, 10, 11, 12, 13, 14, 15, and 16; 3, 5, 6, and 10; 14, 15, and 16; and the like.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A downhole tool comprising:
   a body, wherein at least a portion of the body is degradable when exposed to a wellbore environment; and
   at least one aqueous-degradable sealing element comprising an aqueous-degradable elastomer comprising in the range of 0.05 to 1 parts by weight per hundred parts of the elastomer (phr) of carbodiimide, wherein at least a portion of the aqueous-degradable sealing element hydrolytically degrades when exposed to an aqueous fluid,
   wherein the aqueous-degradable elastomer comprises a polyurethane and a second degradable elastomer, and
   wherein the aqueous-degradable sealing element is at least partially encapsulated in the second degradable elastomer.

2. The downhole tool of claim 1, wherein the aqueous-degradable elastomer comprises in the range of 0.05 to 0.5 phr of carbodiimide.

3. The downhole tool of claim 1, wherein the second degradable elastomer comprises ester linkages.

4. The downhole tool of claim 1, wherein the second degradable elastomer is selected from the group consisting of a polyurethane rubber, a polyester-based polyurethane rubber, a polyether-based polyurethane rubber, a polylactic acid polymer, a polybutylene succinate polymer, a polyhydroxy alkanoic acid polymer, a starch-based resin, a polyethylene terephthalate polymer, a polyester thermoplastic, a polybutylene terephthalate polymer, and any combination thereof.

5. The downhole tool of claim 1, wherein the aqueous-degradable elastomer is a polyurethane rubber.

6. The downhole tool of claim 1, wherein the aqueous-degradable elastomer further comprises an additive selected from the group consisting of an organophilic clay, silica, a metal oxide, carbon black, and any combination thereof.

7. The system of claim 1, wherein the downhole tool is a wellbore zonal isolation device selected from the group consisting of a frac plug, a bridge plug, a packer, a wiper plug, a cement plug, and any combination thereof.

8. The downhole tool of claim 1, wherein the downhole tool is a frac plug.

9. The downhole tool of claim 1, wherein the portion of the body that is degradable comprises a material selected from the group consisting of a polyepichlorohydrin, a terpolymer of epichlorohydrin/ethylene oxide/allyl glycidyl ether, a magnesium metal alloy, an aluminum metal alloy, and any combination thereof.

10. The downhole tool of claim 1, wherein the second degradable elastomer degrades faster than the polyurethane.

11. The downhole tool of claim 1, wherein at least about 50% of an outer surface of the at least one aqueous-degradable sealing element is encapsulated in the second degradable elastomer.

12. A method comprising:
    installing a downhole tool in a wellbore, the downhole tool comprising a body and at least one aqueous-degradable sealing element comprising an aqueous-degradable elastomer comprising in the range of 0.05 to 1 parts by weight per hundred parts of the elastomer (phr) of carbodiimide,
    wherein at least a portion of the body is degradable when exposed to a wellbore environment;
    fluidly sealing two sections of the wellbore with the aqueous-degradable sealing element of the downhole tool, the aqueous-degradable sealing element capable of holding a differential pressure;
    performing a downhole operation; and
    hydrolytically degrading at least a portion of the aqueous-degradable sealing element by exposure to an aqueous fluid in the wellbore environment, such that the aqueous-degradable sealing element no longer is capable of holding the differential pressure,
    wherein the aqueous-degradable elastomer comprises polyurethane and a second degradable elastomer, and
    wherein at least about 50% of an outer surface of the at least one aqueous-degradable sealing element is encapsulated in the second degradable elastomer.

13. The method of claim 12, further comprising degrading at least a portion of the portion of the body that is degradable.

14. The method of claim 12, wherein the aqueous-degradable elastomer comprises in the range of 0.05 to 0.5 phr of carbodiimide.

15. The method of claim 12, wherein the second degradable elastomer comprises ester linkages.

16. The method of claim 12, wherein the second degradable elastomer is selected from the group consisting of a polyurethane rubber, a polyester-based polyurethane rubber, a polyether-based polyurethane rubber, a polylactic acid polymer, a polybutylene succinate polymer, a polyhydroxy alkanoic acid polymer, a starch-based resin, a polyethylene terephthalate polymer, a polyester thermoplastic, a polybutylene terephthalate polymer, and any combination thereof.

17. The method of claim 12, wherein the aqueous-degradable elastomer is a polyurethane rubber.

18. The method of claim 12, wherein the downhole tool is a wellbore zonal isolation device selected from the group consisting of a frac plug, a bridge plug, a packer, a wiper plug, a cement plug, and any combination thereof.

19. The method of claim 12, wherein the downhole tool is a frac plug.

20. The method of claim 12, wherein the portion of the body that is degradable comprises a material selected from the group consisting of a polyepichlorohydrin, a terpolymer of epichlorohydrin/ethylene oxide/allyl glycidyl ether, a magnesium metal alloy, an aluminum metal alloy, and any combination thereof.

21. A system comprising:
    a wellbore; and
    a downhole tool capable of being disposed in the wellbore to fluidly seal two sections thereof, the downhole tool comprising:
    a body, wherein at least a portion of the body is degradable when exposed to a wellbore environment; and
    at least one aqueous-degradable sealing element comprising an aqueous-degradable elastomer comprising in the range of 0.05 to 1 parts by weight per hundred parts of the elastomer (phr) of carbodiimide, wherein at least a portion of the aqueous-degradable sealing element hydrolytically degrades when exposed to an aqueous fluid,
    wherein the aqueous-degradable elastomer comprises polyurethane and a second degradable elastomer, and
    wherein the at least one aqueous-degradable sealing element is at least partially encapsulated in the second degradable elastomer.

22. The system of claim 21, wherein the aqueous-degradable elastomer comprises in the range of 0.05 to 0.5 phr of carbodiimide.

23. The system of claim 21, wherein the second degradable elastomer comprises ester linkages.

24. The system of claim 21, wherein the second degradable elastomer is selected from the group consisting of a polyurethane rubber, a polyester-based polyurethane rubber, a polyether-based polyurethane rubber, a polylactic acid polymer, a polybutylene succinate polymer, a polyhydroxy alkanoic acid polymer, a starch-based resin, a polyethylene terephthalate polymer, a polyester thermoplastic, a polybutylene terephthalate polymer, and any combination thereof.

25. The system of claim 21, wherein the aqueous-degradable elastomer is a polyurethane rubber.

26. The system of claim 21, wherein the downhole tool is a wellbore zonal isolation device selected from the group consisting of a frac plug, a bridge plug, a packer, a wiper plug, a cement plug, and any combination thereof.

27. The system of claim 21, wherein the downhole tool is a frac plug.

28. The system of claim 21, wherein the portion of the body that is degradable comprises a material selected from the group consisting of a polyepichlorohydrin, a terpolymer of epichlorohydrin/ethylene oxide/allyl glycidyl ether, a magnesium metal alloy, an aluminum metal alloy, and any combination thereof.

* * * * *